United States Patent

Kruger

[15] 3,684,166

[45] Aug. 15, 1972

[54] PNEUMATIC DIGITAL-TO-ANALOG CONVERTER WITH STORAGE

[72] Inventor: Siegfried Kruger, Berlin, Germany

[73] Assignee: Shering, A. G. Berlin und Bergkamen, Berlin, Germany

[22] Filed: April 5, 1971

[21] Appl. No.: 131,372

Related U.S. Application Data

[63] Continuation-in-part of Ser. No. 81,724, Oct. 19, 1970.

[52] U.S. Cl. ....235/200, 137/81.5

[51] Int. Cl. ....G06d 5/00

[58] Field of Search ....235/200, 201; 137/81.5

[56] References Cited

UNITED STATES PATENTS

| | | | |
|---|---|---|---|
| 3,414,192 | 12/1968 | Barr et al. | 235/200 |
| 3,491,229 | 1/1970 | Mityashin et al. | 235/201 |
| 3,528,444 | 9/1970 | Hass | 235/201 X |
| 3,601,308 | 8/1971 | Hatch | 235/200 |

*Primary Examiner*—Stephen J. Tomsky
*Assistant Examiner*—Lawrence R. Franklin

[57] ABSTRACT

A device, including storage, which converts digital pneumatic signals into an analog pneumatic signal. A geometric series of flow resistances and logical switching units are used to provide the conversion.

5 Claims, 8 Drawing Figures

INVENTOR
SIEGFRIED KRÜGER

BY *Millen, Raptes & White*
ATTORNEYS

INVENTOR
SIEGFRIED KRÜGER

BY Millen, Raptes & White
ATTORNEYS

INVENTOR
SIEGFRIED KRÜGER

Millen, Raptes & White
ATTORNEYS

PATENTED AUG 15 1972 3,684,166

SHEET 4 OF 6

INVENTOR
SIEGFRIED KRÜGER

BY *Millen, Raptes & White*
ATTORNEYS

INVENTOR
SIEGFRIED KRÜGER
BY Millen, Raptes & White
ATTORNEYS

INVENTOR
SIEGFRIED KRÜGER
BY Millen, Raptes & White
ATTORNEYS

PNEUMATIC DIGITAL-TO-ANALOG CONVERTER WITH STORAGE

CROSS REFERENCE TO RELATED APPLICATIONS

This application is a continuation-in-part of copending application Ser. No. 81,724, filed Oct. 19, 1970.

The invention relates to a pneumatic digital-to-analog converter.

In industry, systems are often operated in explosion-endangered areas. The use of electric systems in these areas requires complicated protective measures. Thus, if possible, devices having a different energy source are employed. Pneumatic devices are, for example preferred in the control and regulation of systems in areas which are in danger of explosion. Since programmable pneumatic control devices can only give out information in binary form (bits), the bits must be converted into analog values. For this purpose, a digital-to-analog converter is required to convert combinations of pneumatic bits present at the output of the control device into an analog signal. This makes it possible to preset analog magnitudes, such as, for example, the desired or nominal values of control circuits, in a variable manner during an automatic control process.

In order to be able to employ also those pneumatic control devices which can be programmed by way of punched tapes or punched cards, it is necessary to be able to store up sequential binary bits of information. Sequential bits put out by the decoding section of the control device are stored in a storage register, in order to transmit thereafter the total information, as desired, to the digital-to-analog converter.

Electrically operating digital-to-analog converters are conventional. However, they cannot be employed as such in explosion-endangered areas because of the possibility of spark formation. In case they are used in explosion-endangered spaces, a double conversion is required (pneumatic-to-electric and electric-to-pneumatic). Due to the rather large expenditure in equipment and the cumulative effect of the inherent errors in portions of the devices, the use of such converters is impractical.

A pneumatically operating digital-to-analog converter is known which works in accordance with the principle of force comparison. The spring-forces effective on one side of a scale-balance beam, caused by the effect of digital signals, are compensated on the other side by a nozzle-baffle-plate system. The analog control pressure of this system is dependent on the combination of the effective digital signals. The disadvantage of this device is, inter alia, that the accuracy depends on the adjustment of the springs and the determination of the point of engagement. Besides, the long-term constancy is poor due to the change in spring characteristics. To be able to maintain an analog value for a certain period of time, the digital signals must be present during the maintenance period.

SUMMARY OF THE INVENTION

The invention relates to the problem of presetting, in a variable manner, analog magnitudes (for example, desired values of control circuits during an automatic control process in explosion-endangered plants), wherein the digital signals can be received simultaneously or in any desired sequence, stored, and then recalled as necessary. The reproducibility must be satisfactory over a long period of time. The analog magnitude must be able to be represented with an accuracy of $\leqq \pm 1$ percent.

This problem is solved by providing a pneumatic digital-to-analog converter with data storage, consisting of series-connected throttle valves, the flow resistance of which increase in a geometric progression. This term means that the flow resistance of each higher-resistance valve is substantially a constant multiple (preferably twice) of that of the next lower-resistance value. The throttle valves are combined with pneumatic logic elements in a three-way function. The converter also includes pneumatic logic elements in the storage function.

For converting variable combinations of pneumatic bits into an analog signal, the throttling valves are introduced into an air stream having a constant volume-per-unit-time by means of initiating digital bit signals, thereby resulting, by their series connection, in the sum of the individual pressure drops being amplified to a unit signal level. In this connection, the initiating signals can be put into the storage unit simultaneously or in any desired sequence, and can be recalled again as necessary.

In this invention, the pneumatic digital-to-analog converter can be constructed of completely-developed prior art building blocks. The device of this invention consists of components which are subjected to practically no wear and tear, resulting in a long lifetime and a high reproducibility of results.

The circuit for the storage and read-out of the bit-signals provided in accordance with this invention has the advantage that the digital pneumatic control signals need be present only in the form of pulses. The pulses can arrive simultaneously or in any desired sequence. The internal storage unit with setting combination exhibits the particular advantage that, due to the synchronization of the pulse and delay-building blocks, as well as due to the inertia of the system connected thereafter, the analog output signal does not drop first to a zero value during the reprogramming of the storage unit, but rather immediately assumes the newly programmed value. Furthermore, it is advantageous that only one common storage register is required for programming several pneumatic digital-to-analog converters. This keeps the cost of the apparatus low.

DESCRIPTION OF THE PREFERRED EMBODIMENT

The following embodiments are used to explain this invention. The twin-diaphragm relays (TDR's) employed as examples are well-known per se and merely represent a preferred form of the invention. Basically, the digital-to-analog converter, the common storage unit, and the internal storage with setting combination can also be constructed with other static pneumatic logic elements, such as, for example, with disc-like or membrane elements with a spring (pneumatic microswitch) or with small piston elements.

Figure 1:
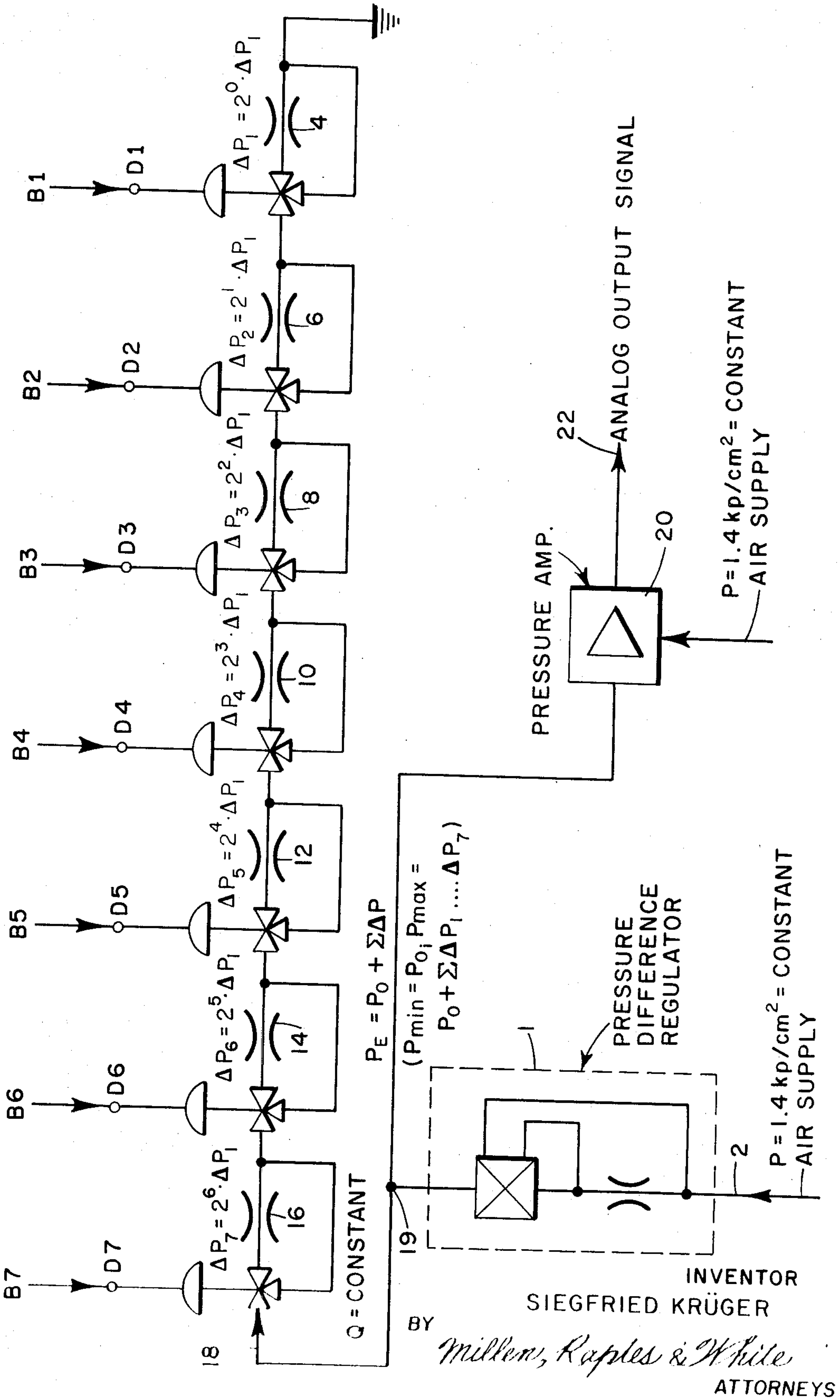
FIG. 1 is a schematic block diagram of a digital-to-analog converter device for use in the present invention.

One embodiment of a pneumatic digital-to-analog converter (DAC) is illustrated in the diagram of FIG. 1, showing the basic circuit. A pressure difference regulator 1 supplied by a constant supply pressure from air supply 2 feeds a constant amount of air per time unit. The throttle valves 4,6,8,10,12,14 and 16, which can be respectively and selectively introduced into the stream of air from line 18 by the bit-control signals D1, D2, D3, D4, D5, D6 and D7, cause a specific increase in the pressure at the input point 19 of the circuit. This provides a pressure indication of the state of the control signals, and this pressure indication is detected and amplified by an amplifier 20 and brought to the required unit signal level at output point 22 to provide an output indicative of the state of the control signals. A pressure amplification is necessary because the circuit is designed for the low-pressure range and this signal level of 0.2 to 1 $kp/cm^2$ [where $kp/cm^2$ means kilograms of force (as measured in Paris, France) per square centimeter, essentially $kg/cm^2$] cannot be produced directly since otherwise the pressure drops in the short-circuited branches of the unused throttle valves are to be taken into account. By staggering the pressure drops in accordance with a geometric progression, it is possible to subdivide a pressure range of 0.2 to 1 $kp/cm^2$, with only seven throttle valves to $1/127 \cong 0.0063$ $kp/cm^2$. This results in a relative error of $\leqq \pm 0.35$ percent, based on 1 $kp/cm^2$. The staggered pressure drops are analogous to the resistor networks used in electrical converters in which each resistor has a resistance value twice that of the previous resistor.

The throttle valves 4,6,8,10,12,14 and 16 are series-connected into the main line 18 so that the flow resistances of the throttle valves increase in accordance with a geometric series. Thus, with a constant air stream Q (constant amount of air per time unit), in the preferred geometric series, a pressure drop $\Delta p_i = 2^{i-1} \cdot \Delta p_1$ is produced at the $i$-th throttle valve (where $i$=1,2, . . . $n$), where $\Delta p_1$ is the pressure drop at the first throttle valve. Upstream of each throttle valve, a pneumatic relay with three-way function is inserted in the main line. This relay can be set, by an associated pneumatic binary switching signal, to selectively switch the next downstream throttle valve into the main line 18 or to circumvent this throttle valve with a shunt line.

The main line is under the effect of a constant air stream Q from the pressure difference regulator 1, which is supplied with a constant supply pressure (for example, $P$=1.4 $kp/cm^2$). Downstream of the pressure difference regulator 1, the existing pressure $P_E$, which can have a minimum value $P_{min}=P_o$ and a maximum value $P_{max}=P_o+\Sigma\Delta P_i$, is applied to pneumatic analog amplifier 20. This amplifier is provided a constant supply pressure (for example, $p$=1.4 $kp/cm^2$) and produces the desired output signal 22.

The binary signals present at points B1 through B7, after arriving, for example, from a pneumatic control device, are applied to the pneumatic relays preferably by way of a storage circuit rather than directly. In this connection, the input signals of the storage unit can be short-time pulses arriving simultaneously or successively, and the output signals D1–D7 of the storage unit can be applied simultaneously to the relays.

Figure 2:
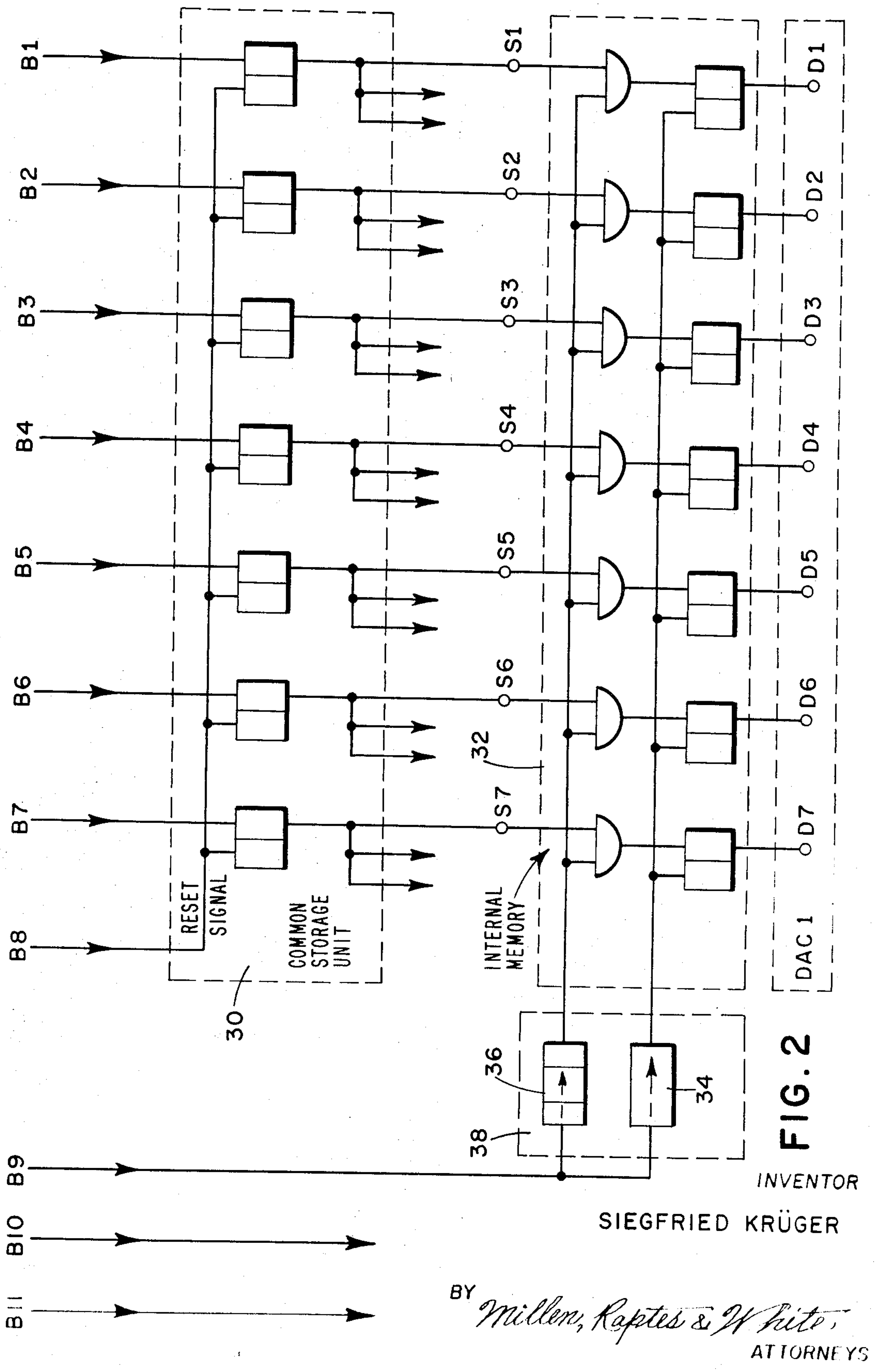
FIG. 2 is a schematic block diagram of a storage circuit for use with the present invention.

FIG. 2 shows a circuit diagram of an embodiment of a storage circuit for the pneumatic digital-to-analog converter of this invention.

This storage circuit consists of a common storage unit 30 and one or more internal memory units 32, as well as a setting combination unit 38. The unit 30 serves for the collection and distribution of the information put out by the control device, while the unit 32 with the setting combination unit 38 is used for the control of the digital-to-analog converter DAC1. The procedure when controlling a D-A converter is as follows: In case control signals are present simultaneously or successively at the terminals for bits B1 through B7, they are stored in a common storage unit 30. Bits B1 through B7 are derived from a pneumatic control device. If the programmed condition is to be transferred to an internal memory 32, an additional control signal is required, as shown on the terminal for bit B9. By the combination of a pulse building block 34 and a delay building block 36 (setting combination 38 for internal storage units), this control signal B9 is sufficient for cancelling the condition previously programmed into the internal storage unit and replacing the same by the new condition obtained in the common storage unit 30. The reprogramming of the common storage unit begins with the RESET signal at the output terminal B8 which places the common storage unit again into the zero-position. Thus, the storage unit is prepared for the subsequent storage of data from outputs B1 through B7.

The binary signals B1–B7 arriving simultaneously or successively from the outputs of a pneumatic control device (not illustrated) are applied to the illustrated individual storage units within the common storage unit 30. The possibly multiple outputs from the respective individual storage units within unit 30 are connected to the respective inputs of several internal memory units 32. (Only one memory unit is illustrated.)

The branching circuits at the output of common storage unit 30 are provided to allow for the possibility of controlling several internal storage units for additional digital-to-analog converters from the common storage. Inputs B10 and B11 allow for the possibility of controlling the setting combinations of additional converters.

In order to be able to control the desired D-A converter, for example DAC1, the signals present at the respective inputs of the common storage unit must be transferred to the illustrated individual storage units within unit 30. For this purpose, the setting combination unit 38 is excited via a further output of the control device, for example B9. This means that the pulse building block 34 provides an output to temporarily erase the individual storage units within internal memory unit 32 via a first common input line. The delay building block 36 provides a gating signal on a second common input line in unit 32 to simultaneously operate a plurality of illustrated AND gates within memory unit 32 thereby allowing input signals S1–S7 to be stored by the illustrated individual storage units in memory unit 32. Thereby, the D-A converter DAC1 obtains its newly programmed control D1–D7 via the respective outputs from the individual storage units in memory unit 32. If another D-A converter is to be controlled, the individual storage units in common storage unit 30 must again be placed into the zero position via the terminal B8 of the control device and the input through pulse building block 34. Accordingly, the common storage unit 30 becomes once again ready to receive the programming for control of another D-A converter in the above described manner.

Figures 3, 5A:
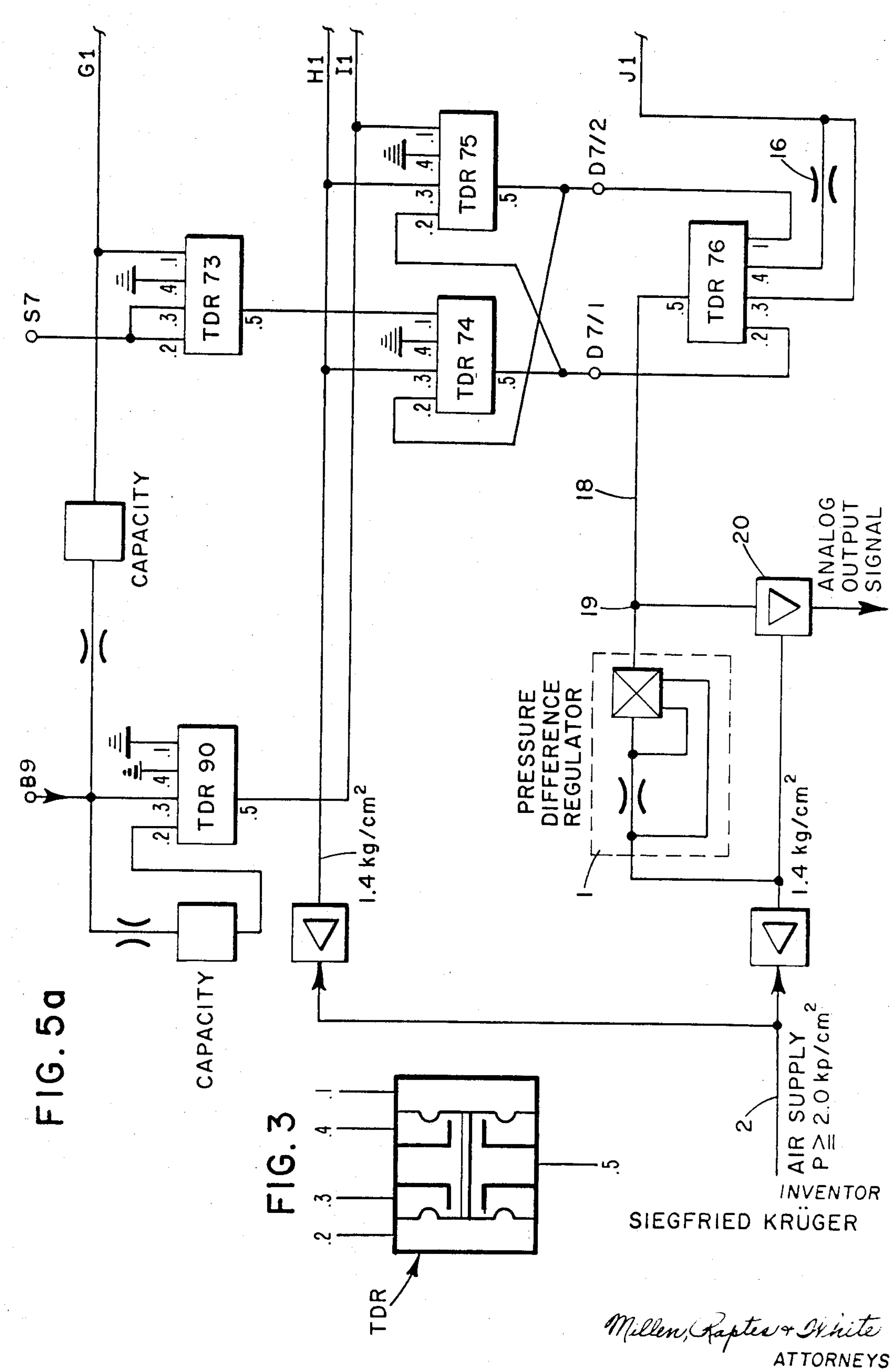
FIG. 3 is a schematic diagram of a twin-diaphragm relay (TDR) for use with the present invention.
FIGS. 5a–5c are a detailed schematic block diagram of the internal memory and digital-to-analog converter from FIGS. 2 and 1, respectively.

FIG. 3 is an illustration of a twin-diaphragm relay (TDR), known per se in the prior art. For example, see "Universal Modular System for Pneumatic Switching Controls", Process Control and Automation, July 1964, pages 310–312, (abstracted from Messen, Steuern, Regeln, No. 2, 1964, pages 63–72, "Universelles Baukastensystem fur pneumatische Steuerungen," by Töpfer et al.)

The illustrated TDR has the following logic function, which should make perfectly clear its functioning in the other figures in which it is used.

| input .1 | input .2 | input .4 | input .3 | input .5 |
|---|---|---|---|---|
| 0 | 0 | 1 | 0 | 1 |
| 1 | 0 | 1 | 0 | 0 |
| 0 | 1 | 1 | 0 | 1 |
| 1 | 1 | 1 | 0 | 1 |
| 0 | 0 | 0 | 1 | 1 |
| 1 | 0 | 0 | 1 | 1 |
| 0 | 1 | 0 | 1 | 0 |
| 1 | 1 | 0 | 1 | 1 |

Figure 4A:
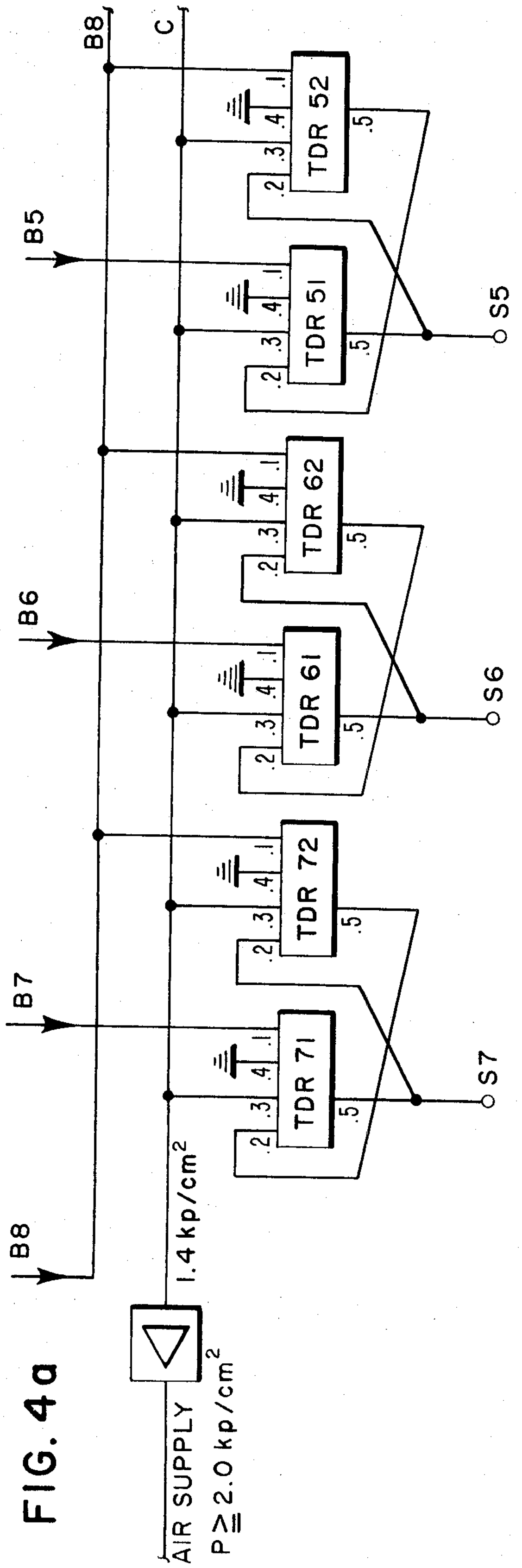
FIGS. 4a and 4b are detailed schematic block diagrams of the common storage unit from FIG. 2.
Figure 4B:
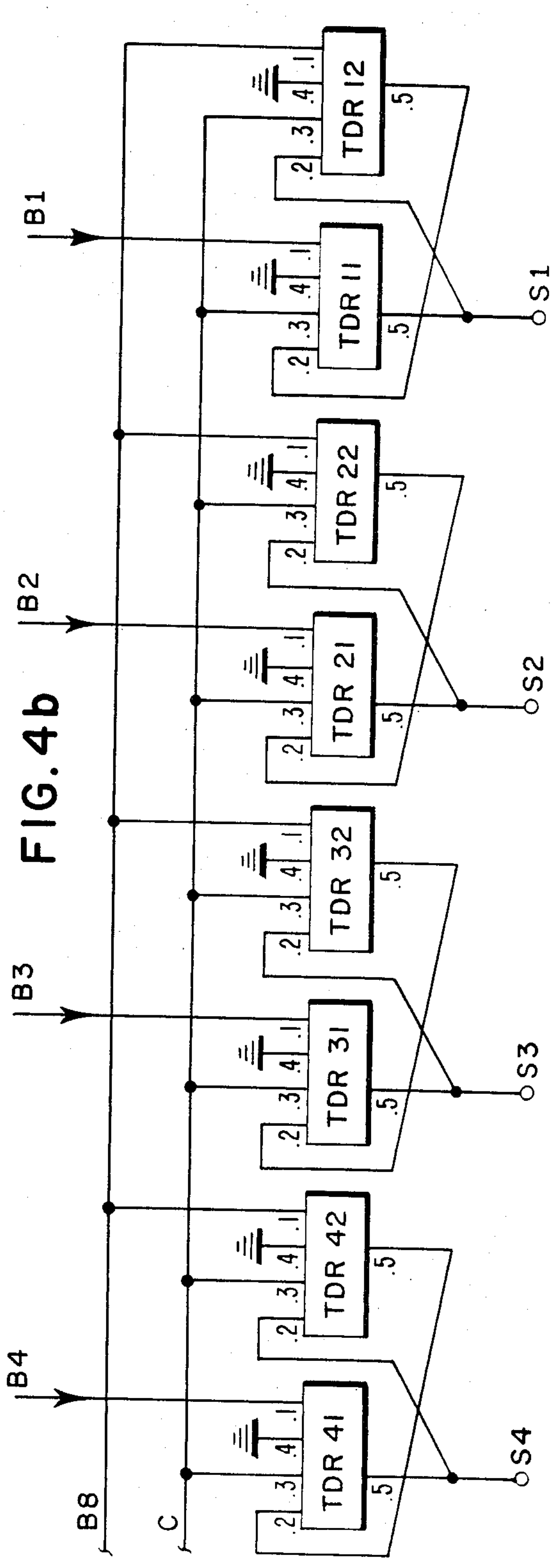

FIGS. 4*a* and 4*b*, taken together, show the construction of the common storage unit 30, which is connected to provide the input bits for the digital-to-analog converter. The construction is of TDR's and is self-evident from the figures.

The binary input signals B1–B7 are respectively applied to the chambers of a set of twin-diaphragm relays TDR 11, TDR 21, TDR 31, TDR 41, TDR 51, TDR 61 and TDR 71 at their respective terminals numbered .1. If a ONE-signal is present at one of these chambers, the two diaphragms, connected by a web, are moved so that the chamber .4 becomes tightly sealed. Thereby the full air-supply pressure (1.4 kp/cm$^2$) can be applied, via the respective chambers numbered .3, to the respective outputs numbered .5. By coupling the respective chambers numbered .2 of respectively associated set of relays TDR 12, TDR 22, TDR 32, TDR 42, TDR 52, TDR 62, and TDR 72, the respective chambers numbered .3 of the set of relays TDR 12–TDR 72 are closed, so that the air-supply pressure cannot be applied then to the respective outlets thereof numbered .5. The respective chambers .2 of the set of relays TDR 11–TDR 71 are vented via the respective outlets numbered .5 and the serial path to the atmosphere through respective chambers numbered .4 of the set of relays TDR 12–TDR 72. By this mode of coupling, the desired storage of the input signals B1–B7 is attained. A flipping of all storage elements into the ZERO-position, thus eliminating an output signal at the output connection numbered .5 of the set of relays TDR 11–TDR 71, is obtained by means of a ONE-signal at the RESET input B8. The signal is applied to the chambers numbered .1 of the set of relays TDR 12–TDR 72 and causes a ONE-signal at the output numbered .5 of the set of relays TDR 12–TDR 72, while the set of relays TDR 11–TDR 71 have a ZERO-output signal. The individual storage units of common storage unit 30, composed of both relay sets, can now be programmed again via the B1–B7 inputs.

All relays in both sets in FIGS. 4*a* and 4*b* are connected with their chambers numbered .3 receiving a constant air pressure of 1.4 kp/cm$^2$, whereas the chambers numbered .4 are directly in communication with the atmosphere.

Figure 5B:
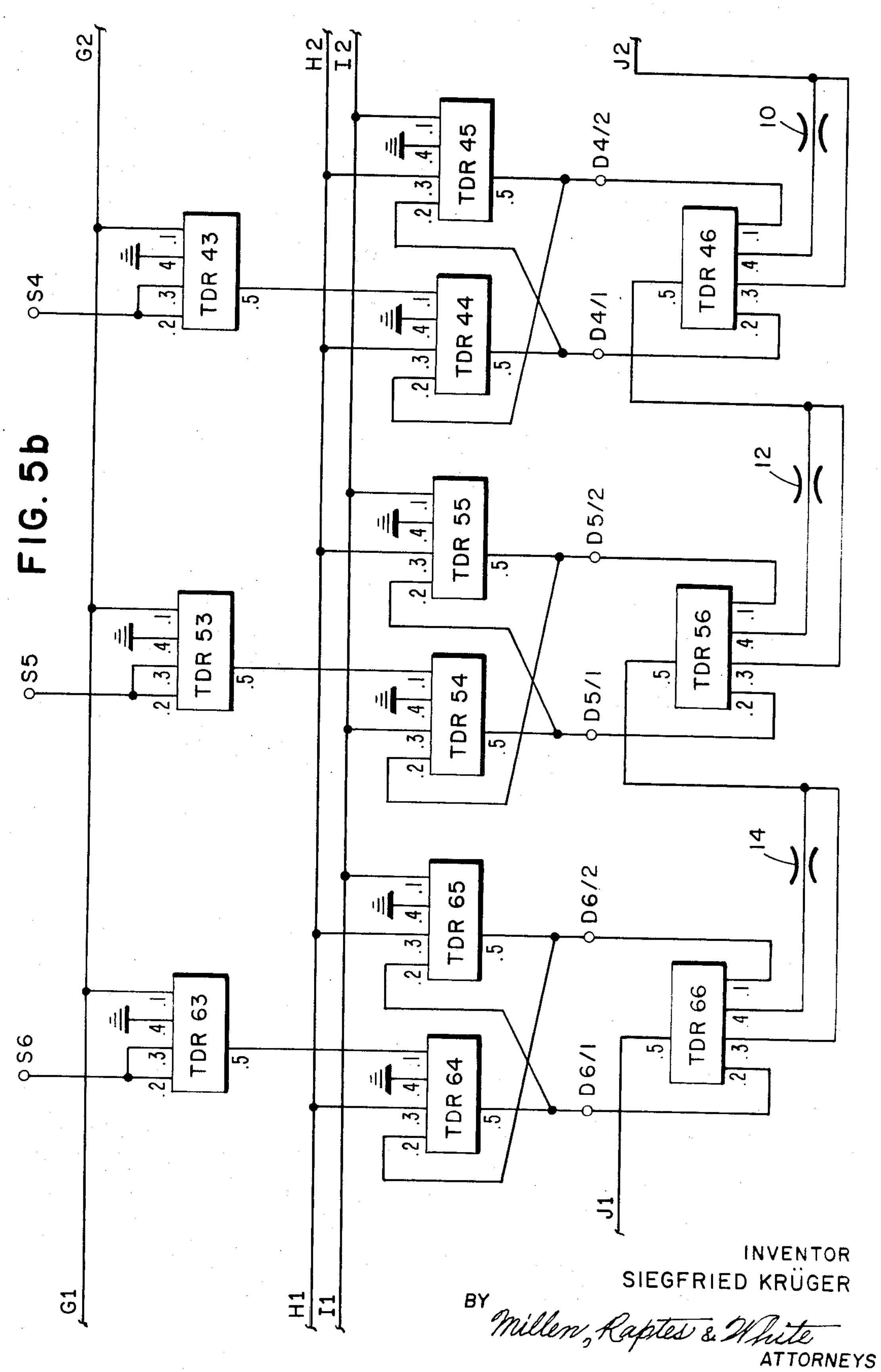
Figure 5C:
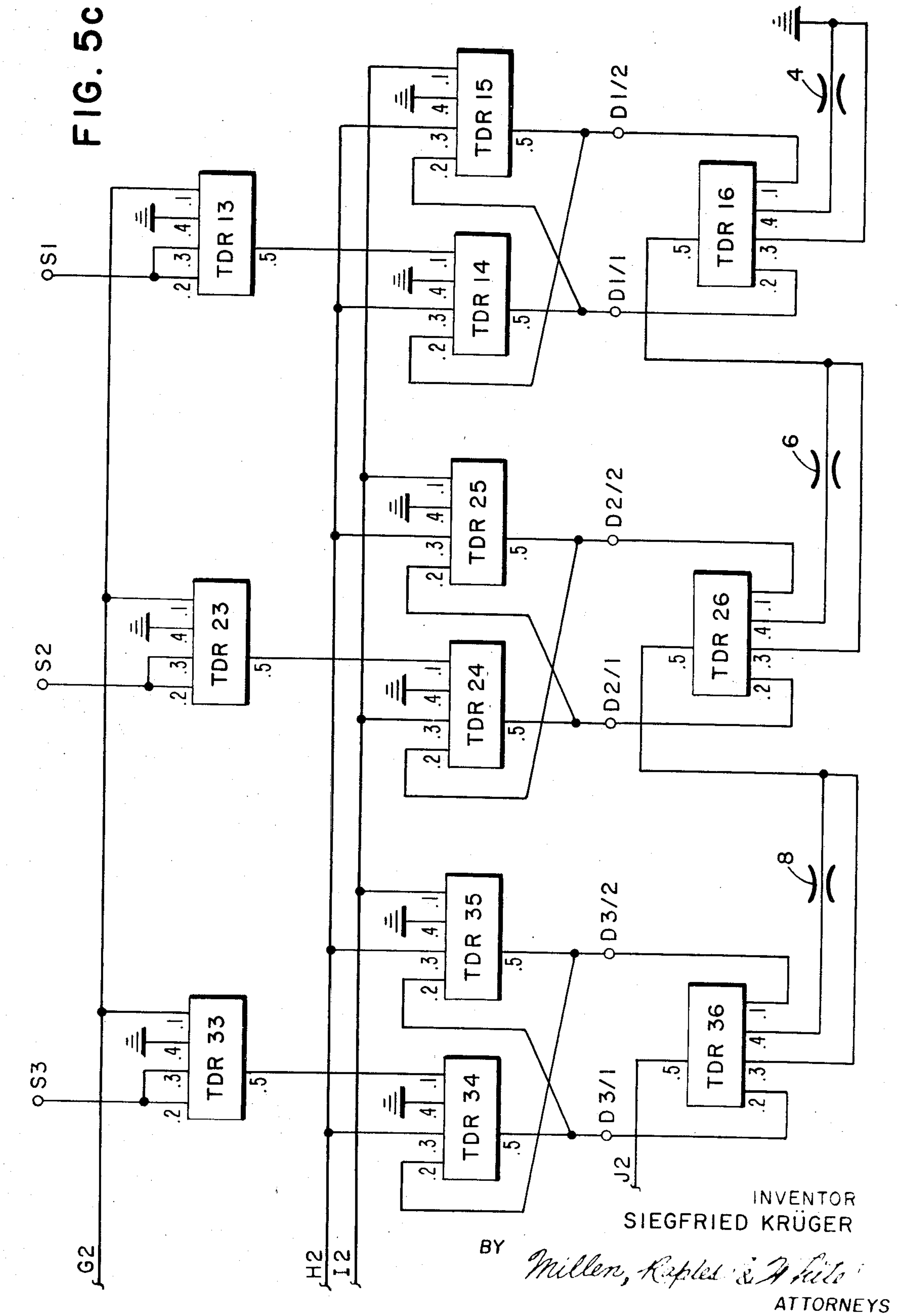

FIGS. 5*a*–5*c* taken together, show the construction of the internal memory 32 and the digital-to-analog converter (DAC 1) of FIGS. 1 and 2. Corresponding numerals indicate corresponding parts. The construction is of TDR's, capacities and amplifiers and is self-evident from the figures.

The binary signals S1–S7 are applied in parallel to the respective chambers numbered .2 and .3 of the set of relays TDR 13, TDR 23, TDR 33, TDR 43, TDR 53, TDR 63 and TDR 73. If a ONE-signal is present at these chambers, this is insufficient as yet to cause a ONE-signal at the respective output numbered .5, since, because the diaphragm area ratio of the chamber numbered .2 to the chamber numbered .3 is 2:1, the chamber .3 is closed. Only if additionally a ONE-signal is applied to the chamber numbered .1, does the outlet numbered .5 generate a ONE-signal, i.e., the AND-conditions required by the illustrated individual AND-gates in internal memory 32 are met. This condition is required in order to be able to SET the illustrated individual storage units in internal memory 32. The structure of these individual storage units with the set of pairs of relays TDR 14 and TDR 15, TDR 24 and TDR 25, TDR 34 and TDR 35, TDR 44 and TDR 45, TDR 54 and TDR 55, TDR 64 and TDR 65, TDR 74 and TDR 75 is the same as in the individual storage units described in connection with FIGS. 4a and 4b, except that in this case both storage terminals numbered .5 of the respective relays in the set of pairs listed are connected to respective output points D 1/1 and D 1/2, D 2/1 and D 2/2. . . D 7/1 and D 7/2. If a ONE-signal is present only at output points D 1/1, D 2/1, D 3/1. . . D 7/1, the output pressure is applied to the chamber numbered .2 of the respective associated relays TDR 16, TDR 26, TDR 36 . . . TDR 76, and causes closing of respective chambers numbered .3. In this manner, the air stream, kept constant by the pressure difference regulator 1, must flow serially through chambers numbered .5 and .4 of relay set TDR 1–TDR 76 and thus to cause pressure drops at the respective throttle valves 4,6,8,10,12,1416, the sum of which drops is brought to the desired signal level by the analog amplifier 20. If the individual storage units within internal memory 32 are erased, the ONE-signal effective at the respective chambers numbered .1 of the set of relays TDR 16–TDR 76 causes closing of the chambers numbered .4. The constant air stream is then conducted to the atmosphere via the respective shunt lines around the individual throttle valves. The pulse-shaped erasing signal for the individual storage means in internal memory 32 comes from pulse building block 34 and is applied to the chambers numbered .1 of all the set of relays TDR 15–TDR 75. This pulse is produced by the pulse building block 34 of the setting combination unit 38. The pulse is obtained by the fact that a ONE-signal present at terminal B9 is applied fully to the output numbered .5 in the first instant, via the chamber numbered .3 of the relay TDR 90, but disappears again after a brief period of time—filling up of the capacity connected between terminal B9 and the input numbered .2 via the throttle valve connected in series therewith. The pressure built up in this capacity has then tightly sealed the chamber numbered .3 of the relay TDR 90 via the diaphragm, so that the ONE-signal at the output numbered .5 disappears after a short time.

A ONE-signal present at terminal B9 is likewise used with a delay, on individual AND-gates in memory 32 via the input from unit 36. This unit produces delay by building up the required pressure for a ONE-signal via the throttle valve and capacity connected in series between terminal B9 and TDR 73. By synchronizing the two throttle valves fed by terminal B9, the effect is attained that first the individual storage units of the internal memory 32 are placed into the ZERO-position for a short time, in order to be able thereafter to store immediately the newly programmed value from the common storage unit 30 via the individual AND-gates in memory 32. Because of the inertia of the entire system, the D-A converter thus immediately puts out its newly programmed value without going to the value zero.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. Pneumatic digital-to-analog conversion system, comprising:
   A. a plurality of throttle valves adapted to be connected in a series arrangement, the flow resistance of each higher-resistance valve being substantially a constant multiple of that of the next lower-resistance valve,
   B. pneumatic logic elements responsive to binary pneumatic switching signals for switching the throttle valves selectively into or out of said series arrangement,
   C. means for causing fluid to flow through the series arrangement to provide a pressure indication at one end of the series arrangement, and
   D. means for detecting the pressure indication to provide an output signal indicative of the state of the control signals.

2. A system according to claim 1 wherein the constant multiple is two.

3. A system according to claim 1 wherein said fluid is air having a constant volume flow per unit time.

4. A system according to claim 3 further comprising a storage unit for receiving pneumatic digital initiating signals from some signal source, storing indications of the initiating signals for a period of time, and providing the binary pneumatic switching signals.

5. A system according to claim 3, further comprising:
   A. common storage unit means (30) responsive to a plurality of pneumatic binary input signals (B1–B7) and to a RESET input signal (B8) for receiving said binary input signals, whether they arrive simultaneously or sequentially and temporarily storing data corresponding to said binary input signals, said common storage unit means comprising a plurality of pairs of twin-diaphragm relays (TDR 11 and TDR 12, TDR 21 and TDR 22, TDR 31 and TDR 32, TDR 41 and TDR 42, TDR 51 and TDR 52, TDR 61 and TDR 62, and TDR 71 and TDR 72) connected to form a corresponding plurality of bistable storage devices, the number of said bistable storage devices also corresponding to the number of said binary input signals, one of the twin-diaphragm relays in each said pair being connected to respond to a respective one of said binary input signals, the other of the twin-diaphragm relays in each said pair being connected to respond to said RESET signal, each of said pairs of twin-diaphragm relays acting in correct to provide at the output a corresponding plurality of second binary signals (S1–S7),
   B. delay means (36) for receiving a delaying a timing signal (B9) to provide at its output a gating signal,
   C. a plurality of twin-diaphragm relays (TDR 13, TDR 23, TDR 33, TDR 43, TDR 53, TDR 63, and TDR 73) connected to respond as AND-gates to said gating signal and respectively to said second binary signals (S1–S7) to logically generate a plurality of gate-output signals,
   D. pulse means (34) responsive to said timing signal (B9) to provide at its output a pulse signal,
   E. memory means comprising a second plurality of pairs of twin-diaphragm relays (TDR 14 and TDR 15, TDR 24 and TDR 25, TDR 34 and TDR 35, TDR 44 and TDR 45, TDR 54 and TDR 55, TDR 64 and TDR 65, and TDR 74 and TDR 75) connected to form a corresponding plurality of second bistable storage devices, the number of said second bistable storage devices also corresponding to the number of said gate-output signals, one of the twin-diaphragm relays in each of these pairs being connected to respond to a respective one of said gate-output signals, the other of the twin-diaphragm relays being connected to respond to said pulse signal, each of said second plurality of pairs providing an output signal from each twin-diaphragm relay in each pair, and
   F. said pneumatic logic elements being a group of twin-diaphragm relays responsive to both of the output signals from each of said second plurality of pairs.

* * * * *